(12) United States Patent
Nimri et al.

(10) Patent No.: US 7,969,461 B2
(45) Date of Patent: *Jun. 28, 2011

(54) SYSTEM AND METHOD FOR EXCHANGING CONNECTION INFORMATION FOR VIDEOCONFERENCING UNITS USING INSTANT MESSAGING

(75) Inventors: Alain Nimri, Austin, TX (US); Stephen Schaefer, Cedar Park, TX (US); Rick Flott, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 11/277,979

(22) Filed: Mar. 30, 2006

(65) Prior Publication Data

US 2007/0263075 A1 Nov. 15, 2007

(51) Int. Cl.
*H04N 7/14* (2006.01)
(52) U.S. Cl. ............... 348/14.08; 238/14.09; 238/14.12; 709/204
(58) Field of Classification Search .... 348/14.01–14.16; 370/260–261; 709/204–206
See application file for complete search history.

(56) References Cited

U.S. PATENT DOCUMENTS

| | | | |
|---|---|---|---|
| 5,854,893 A | 12/1998 | Ludwig et al. | |
| 6,237,025 B1 | 5/2001 | Ludwig et al. | |
| 6,351,762 B1 | 2/2002 | Ludwig et al. | |
| 6,583,806 B2 | 6/2003 | Ludwig et al. | |
| 6,594,688 B2 | 7/2003 | Ludwig et al. | |
| 6,924,831 B2 | 8/2005 | Huang | |
| 7,058,122 B2 | 6/2006 | Brown et al. | |
| 7,353,251 B1 | 4/2008 | Balakrishnan | |
| 7,474,326 B2 * | 1/2009 | Le Pennec | 348/14.09 |
| 7,589,757 B2 | 9/2009 | Nimri | |
| 7,631,039 B2 * | 12/2009 | Eisenberg | 709/204 |
| 2002/0118809 A1 | 8/2002 | Eisenberg | |
| 2004/0148406 A1 | 7/2004 | Shima | |
| 2006/0004911 A1 * | 1/2006 | Becker et al. | 709/207 |
| 2006/0116139 A1 * | 6/2006 | Appelman | 455/466 |
| 2006/0179114 A1 | 8/2006 | Deeds | |
| 2007/0036157 A1 * | 2/2007 | Watanabe et al. | 370/389 |
| 2007/0189276 A1 * | 8/2007 | Bennett | 370/356 |
| 2007/0192427 A1 | 8/2007 | Berstis | |
| 2007/0263074 A1 | 11/2007 | Nimri | |

* cited by examiner

*Primary Examiner* — Melur Ramakrishnaiah
(74) *Attorney, Agent, or Firm* — Wong, Cabello, Lutsch, Rutherford & Brucculeri LLP

(57) ABSTRACT

A videoconferencing system includes a first videoconferencing unit coupled to a network and associated with a first instant messaging identity. The first videoconferencing unit obtains a second instant messaging identity and automatically sends a request instant message requesting videoconferencing connection information to the second instant messaging identity. A second videoconferencing unit is coupled to the network and is associated with the second instant messaging identity. The second videoconferencing unit receives the request instant message and automatically returns a response instant message including videoconferencing connection information to the first instant messaging identity. The first videoconferencing unit receives the response instant message and automatically obtains the videoconferencing connection information from the response instant message. Using the videoconferencing connection information, the first videoconferencing unit initiates a videoconference call with the second videoconference unit.

22 Claims, 4 Drawing Sheets

SYSTEM AND METHOD FOR EXCHANGING CONNECTION INFORMATION FOR VIDEOCONFERENCING UNITS USING INSTANT MESSAGING

CROSS-REFERENCE TO RELATED APPLICATIONS

This application is filed concurrently with U.S. patent application entitled "System and Method for Exchanging Connection Information for Videoconferencing Units Using E-Mails," having Ser. No. 11/277,967, which is hereby incorporated herein by reference in its entirety.

FIELD OF THE DISCLOSURE

The subject matter of the present disclosure relates to a system and method for the exchange of connection information for videoconferencing units with instant messaging.

BACKGROUND OF THE DISCLOSURE

Videoconferencing systems use Internet Protocol ("IP") addresses to establish connections between them. When the IP address is not fixed, users may find it difficult to find and dial each participant's IP address to establish the videoconference. For example, a user may not have access to a directory server to obtain the current IP addresses for potential participants of the videoconference. Thus, the user may have to call each participant to obtain his or her IP address over the telephone. The user must then manually enter the current IP addresses into the user's videoconferencing system to initiate videoconference calls to the potential participants.

The subject matter of the present disclosure is directed to overcoming, or at least reducing the effects of, one or more of the problems set forth above.

SUMMARY OF THE DISCLOSURE

A videoconferencing system includes a first videoconferencing unit and one or more second videoconferencing units. The videoconferencing units are communicatively connected to one or more servers, such as an instant messaging (IM) server, via one or more networks. The first videoconferencing unit is associated with a first IM identity, and the one or more second units are associated with one or more second IM identities. The first videoconferencing unit and the one or more second videoconferencing units each include an IM client application. Back-end instant messages between the first videoconferencing unit and the one or more second videoconferencing units are used to exchange information for connecting the videoconferencing units in a videoconference call.

To exchange instant messages, the IM client applications first connect to the IM server. For example, a user at the first videoconferencing unit configures the IM client application to log into the IM server by providing the server with the unit's IM identity and other information for connecting with the IM client application of the first unit. The provided information can include, but may not be limited to, the Internet Protocol ("IP") address of the first videoconferencing unit, the port number assigned to the unit's IM client application, a Jabber Identifier ("JID"), or any other information known in the art. The first videoconferencing unit may also provide second IM identities of one or more of the second videoconferencing units. These second IM identities may be listed in a "buddy list" database that is part of the first videoconferencing unit or stored at the IM server. The IM server then creates a temporary file and stores the information for the first videoconferencing unit and the IM identities of the buddy list.

Once the first videoconferencing unit has logged into the IM server, the server determines which of the second videoconferencing units are also currently logged into the server, and the IM server provides the first videoconferencing unit with information of the second videoconferencing units that are logged-in (which can also be referred in the art as "presence"). The first videoconferencing unit displays the logged-in units, which may be represented by their IM identities. The user then selects one or more of the second videoconferencing units that are logged-in to participate in a videoconference call. For example, the user can manually enter the IM identities of the second videoconferencing units or can select them from the buddy list.

When the first videoconferencing unit is ready to call the second videoconferencing units, the first videoconferencing unit automatically generates request instant messages to request videoconferencing connection information from the second videoconferencing units selected. For example, the first videoconference unit constructs each request instant message to include the first IM identity of the first videoconferencing unit as the source of the instant messages, a second IM identity of one of the second videoconferencing units as a destination, and an indication of what videoconferencing connection information (e.g., address) is requested from the second videoconferencing unit. The requested videoconferencing connection information can include, but may not be limited to, the Integrated Services Digital Network ("ISDN") address, Internet Protocol ("IP") address, Session Initiation Protocol ("SIP") address, the number for the IP-to-IP Gateway number of the second videoconferencing unit, or any other connection information used for videoconferencing. The address or number can be fixed, or it can change depending on how the second videoconferencing unit is assigned its videoconferencing address or number. The requested connection information can also include information regarding encryption or authentication associated with the second videoconferencing unit.

Once the request instant messages are generated, the first videoconferencing unit sends the request instant messages to the IM client applications on the second videoconferencing units. For example, the IM server can route the request instant message to the second videoconferencing units. The second videoconferencing units receive the request instant messages and parse the coded language of the message to determine what information is requested. The second videoconferencing units then obtain the requested information from associated databases, and each of the second units automatically generates a response instant message by including its second IM identity as the source, the first IM identity as the destination, and the ISDN address, IP address, SIP address, or the IP-to-IP Gateway number for establishing a videoconference call with the unit. The second videoconferencing units then send the response instant messages to the IM identity of the first videoconferencing unit.

When the first videoconferencing unit receives the response instant messages, the first unit automatically obtains the videoconferencing connection information (e.g., address) from the response instant messages by parsing the coded language and extracting the information. Using the videoconferencing connection information obtained, the first videoconferencing unit then initiates videoconference calls with the second videoconference units using a videoconferencing application.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
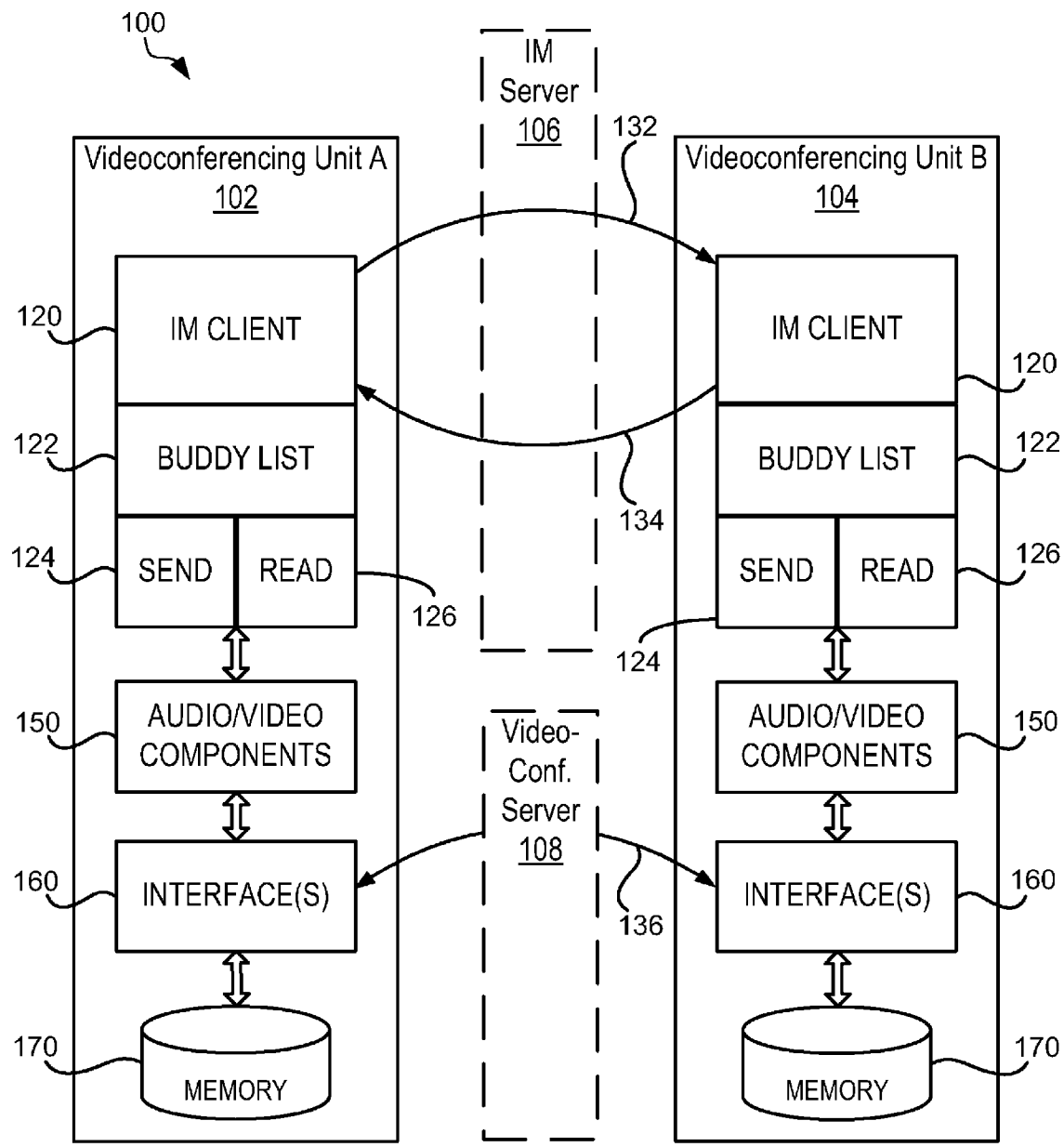
FIG. 1 illustrates an embodiment of a videoconferencing system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner.

DETAILED DESCRIPTION

Referring to FIG. 1, a videoconferencing system 100 according to certain teachings of the present disclosure is schematically illustrated. The videoconferencing system 100 of FIG. 1 uses instant messages 132 and 134 between a first (calling) videoconference unit 102 and one or more second (reciepient) videoconference units 104. The instant messages 132 and 134 exchange connection information that is then used to establish a videoconference call between a calling videoconference unit 102 and one or more recipient videoconference units 104. For example, the instant messages 132 and 134 exchange current Integrated Services Digital Network (ISDN) address, Internet Protocol (IP) address, Session Initiation Protocol (SIP) address, a number for an IP-to-IP Gateway, or any other connection information for establishing a videoconference call between the units 102 and 104. The instant messages 132 and 134 may be handled by one or more instant messaging servers 106 via the Internet, for example.

Each unit 102 and 104 includes an instant messaging client application 120 as an internal component of its software. The instant messaging (IM) client application 120 of each unit 102 and 104 has a buddy list function 122. In addition. The IM client application 120 has a send function 124 for sending instant messages 132 and 134 and a read function 126 for parsing instant messages 132 and 134. The send function 124 for sending instant messages, although it can be initiated by the user, is preferably operated automatically by the IM client application 120 of the videoconferencing units 102 and 104. For example, the send function 124 preferably formats and configures appropriate information in an instant message 132 and sends it to the selected reciepient unit(s) 104. To configure the request, the send function 124 can code the information using an appropriate language (e.g., Extensible Markup Language) and can arrange the information in a predefined format known to the specified reciepient unit(s) 104 (e.g., using text and markup).

Likewise, the read function 126 for reading instant messages is preferably operated automatically by the IM client application 120 of the units 102 and 104. For example, the read function 126 preferably retrieves appropriate information automatically from a received instant message 132 or 134. To retrieve information from the instant message, the send function 124 can parse the code of the instant message 132 or 134 and can extract appropriate information from that parsed code.

The videoconferencing units 102 and 104 also include audio and video components 150, one or more network interfaces 160, and a database or memory 170. The memory 170 can temporarily store IM identities and other instant messaging connection information for the buddy list function 122. The IM identities and other instant messaging connection information are typically obtained from an Instant Messaging server 106 where the information is stored. Alternatively, the instant messaging connection information and identities may be stored on one or more instant messaging servers 106. In addition, the memory 170 can store videoconferencing connection information and other details related to establishing a videoconference call with the associated videoconferencing unit 102 and 104.

The audio and video components 150 can be those components known in the art for handling audio and video of a videoconference. For example, the audio and video components 150 can include software and circuitry for encoding, decoding, compressing, and decompressing audio and video signals for a videoconferece session. Likewise, the network interfaces 160 can include those components known in the art for handling communications 136 of a videoconference. Accordingly, the audio and video components 150 and the network interfaces 160 are not described in detail herein. The videoconference communications 136 between interfaces 160 of videoconferencing units 102 and 104 may be conducted through a network 108, which may or may not be the same network as the instant messaging servers 106.

In FIG. 1, the instant messages 132 and 134 are shown being transmitted apart from the one or more network interfaces 160 for illustrative purposes. It will be appreciated that each unit 102 and 104 can have one interface 160 for handling instant messages 132 and 134 and another interface 160 for handling videoconference calls 136. Alternatively, it will be appreciated that each unit 102 and 104 can use the same network interface 160 for handling both instant messages 132 and 134 and videoconference calls 136. In one embodiment, one network interface 160 is used on each unit 102 and 104 for handling both instant messages 132 and 134 and videoconference calls 136 over the Internet.

Figure 2:
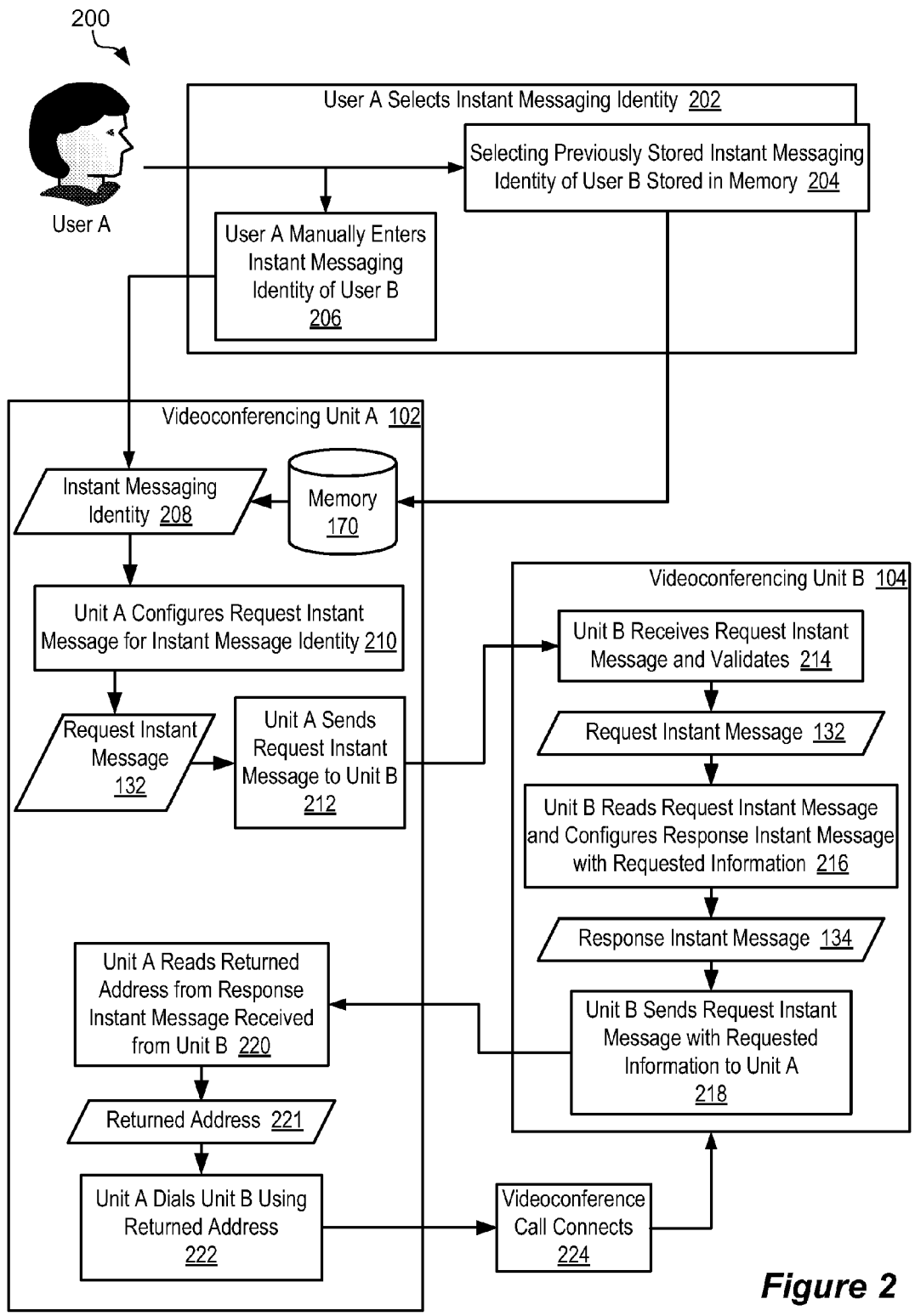
FIG. 2 is a data flow diagram illustrating a process of operation of the disclosed videoconferencing system.

FIG. 2 is a data flow diagram illustrating a process of operation of the disclosed videoconferencing system. (Element numerals of components in FIG. 1 are concurrently provided in the discussion of FIG. 2). In the discussion that follows, it is assumed that a user at a first videoconerencing unit 102 wants to establish a videoconference call with a user at a second videoconferencing unit 104. Both units 102 and 104 have IM client applications 120 internal to their software, and each unit 102 and 104 has an assigned IM identity (e.g., "PolycomUnit1234" and "PolycomUnit789 " or, in the alternative, "John1234@server.com" and "Jill789@host.org").

Initially, a first user (e.g., user A) initiates contact with user B by selecting an IM identity (Block 202). In one example of Block 204, user A can select a IM identity 208 for user B that has been previously stored in memory 170 of user A's unit 102 using the buddy list function 122. In another example of Block 206, user A can manually enter the IM identity 208 for user B. An example of a screen for initiating this contact is discussed below with reference to FIG. 3. Once user A has selected the IM identity 208 of the videoconference participants, first videoconferencing unit 102 of user A automatically configures a request instant message 132 requesting information for connecting with unit 104 for a videoconference (Block 210). As noted previously, the send function 124 automatically constructs the request instant message 132 by arranging the requested information in a predefined format using an approriate coding language for the request instant message 132. The requested information includes, but is not limited to, the ISDN address, IP address, SIP address, or number for an IP-to-IP Gateway of second videoconferencing unit 104.

After configuring the request instant message 132 at Block 210, the first videoconferencing unit 102 sends the request instant message 132 to the second videoconferencing unit 104 using the previously entered or selected IM identity 208 (Block 212). An example of a request instant message requesting information from a videoconferencing unit is discussed below with reference to FIG. 4. As noted above, the request instant message 132 may be handled using instant messaging servers or transmitted directly, in both cases using other components known in the art.

After the request instant message 132 is sent at Block 212, the second videoconferencing unit 104 recieves the request instant message 132 and validates the request for information (Block 214). The process of validation can be used when customary encryption and authentication safegaurds are used by units 102 and 104. Preferably, the second videoconferencing unit 104 is preconfigured to accept and recognize request instant messages 132 from the first videoconferencing unit 102. In this way, the validation process performed at the second unit 104 can be simplified.

After validation, the second videoconferencing unit 104 automatically reads the the request instant message 132, obtains the requested information, and configures a response instant message 134 with the videoconferencing connection information (Block 216). As noted previously, the read function 126 of the second unit 104 automatically parses the code of the request instant message 132 and determines what information is requested. Then, the instant messaging application 120 obtains the requested information from the unit's memory or database 170. Next, the send function 124 automatically constructs the response instant message 134 by arranging the requested information in a predefined format using an appropriate coding language for the instant message 134.

The second videoconferencing unit 104 then sends its response instant message 134 back to the first videoconferencing unit 102 (Block 218). In addition to the ISDN address, IP address, SIP address, or IP-to-IP Gateway number, the response instant message 134 can include other information relevant to establishing a videoconference with the second videoconferencing unit 104. For example, the response instant message 134 can include information about encryption and authentication that the first unit 102 may need to establish the connection with second unit 104. An example of a response instant message returning information to a videoconferencing unit is discussed below with reference to FIG. 5.

When the response instant message 134 is received, the first videoconferencing unit 102 reads the response instant message 134 to obtain the connection information (Block 220). Based on the connection information, the first videoconferencing unit 102 then dials or calls the second videoconferencing unit 104 (Block 222). Finally, the videoconference call is established as the first and second units 102 and 104 connect (Block 224).

Figure 3:
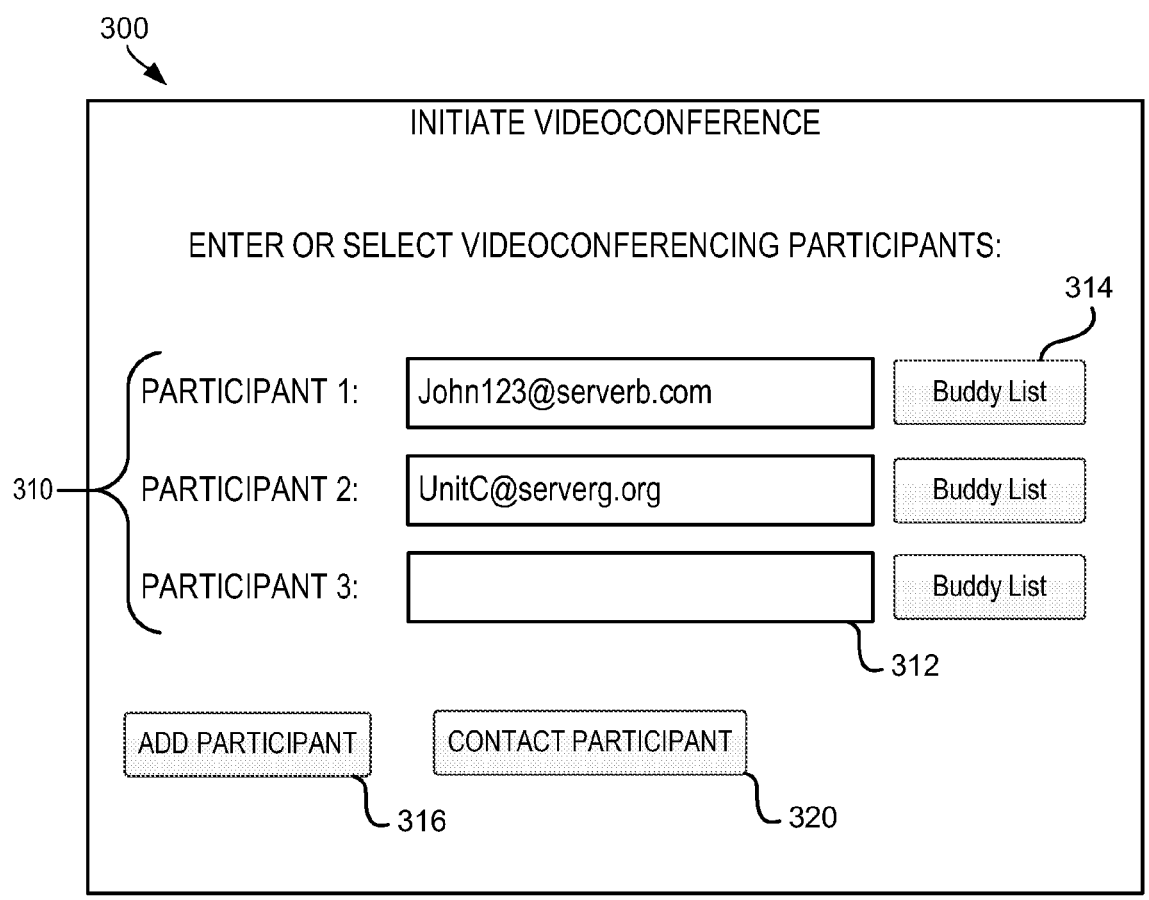
FIG. 3 illustrates an example of a graphical user interface for initiating a videoconference according to the present disclosure.

As discussed previously, once the first videoconferencing unit 102 has logged in, a user at a videoconferencing unit can initiate contact with potential participants by entering or selecting IM identities of other videoconferencing units. Referring to FIG. 3, an example of a screen 300 for entering or selecting instant message identities to initiate a videoconference is illustrated. In this screen 300, which is accessible using a user interface for a videoconferencing unit, the user can enter the instant message identities of one or more other videoconferencing units 310 with which the user wishes to initiate a videoconference. In one way, the user can manually enter an instant message identity for a videoconferencing unit 310 in one of the participant fields 312. In another way, the user can select a buddy list button 314 and access a buddy list screen (not shown) that lists various temporarily saved user names and associated instant message identities. These temporarily saved user names and identities are originally stored at an IM server (not shown) and can be constantly refreshed at the videoconferencing unit as users log in or out. By then selecting from the list, the participant field 312 in the screen 300 can be populated with the associated instant message identity of the selected videoconferencing unit 104. More videoconferencing units can be added by selecting an Add Participant button 316. When the user has selected all the desired videoconferencing units 310 to participate, the user can finish the selection process by selecting a button 320 to initiate back-end contact with the videoconferencing units 310. At this point, the user's videoconferencing unit composes and sends request instant messages to the instant message identities of the videoconferencing units 310.

Figure 4:
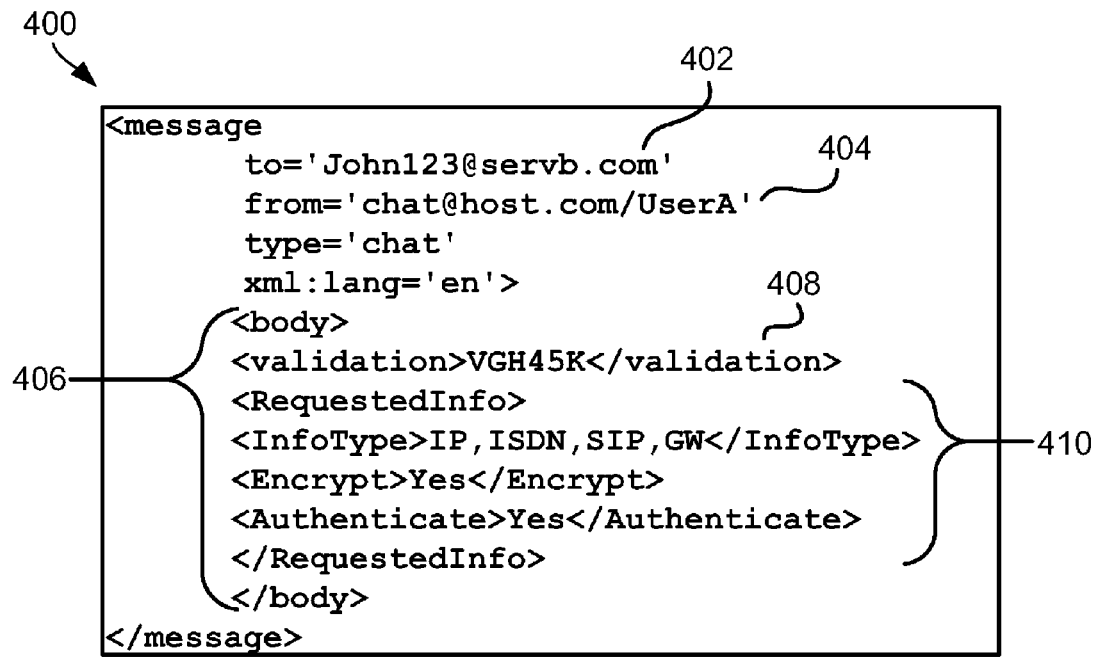
FIG. 4 illustrates an example of an instant message requesting connection information from a videoconferencing unit.

As discussed previously, a request instant message is sent from one videoconferencing unit to another unit to request videoconferencing connection information. Referring to FIG. 4, an example of a request instant message 400 for requesting videoconferencing connection information from a videoconferencing unit is illustrated. The request instant message 400 is illustrated in pseudo-code for convenience, but it is understood that the actual instant message 400 includes source code in the Extensible Messaging and Presence Protocol ("XMPP") or other suitable computer language, for example. In addition, the request instant message 400 is shown requesting certain information in an exemplary format in the Extensible Markup Language ("XML"). The details and format are provided for illustrative purposes, and the request instant message 400 can have any details and format commensurate with the teachings of the present disclosure.

The request instant message 400 lists the instant message identity 402 of the videoconferencing unit (e.g. "chat@host.com/UserA") that is the source and the instant message identity 404 of the videoconferencing unit (e.g. "John123@servb.com") that is the destination. The request instant message 400 is configured in English. The request instant message 400 can also include a body 406 that can contain some form of code for the receiving videoconference unit to recognize the type of request.

The body 406 includes text and markup containing various validation codes or the like recognized by the receiving videoconferencing unit and used to validate the request instant message 400. The body 406 also includes a "RequestedInfo" header with text and markup 410 requesting various pieces of information. For example, the text and markup 410 includes a request for the connection information, such as the ISDN address, IP address, SIP address, or the IP-to-IP Gateway number, of the receiving videoconferencing unit. In addition, the information requested in text and markup 410 includes encryption or authentication information that may be needed to establish a videoconference call with the the receiving videoconferencing unit. This information can be formated using various headers, tags, codes, or the like that will be recognized by the software of the various videoconferencing units. Because the instant message 400 is coded in XML or other suitable computer language, the recieving videoconferencing unit has software capable of parsing and extracting information from the instant message 400 and capable of processing the extracted information to validate and comply with the request.

Figure 5:
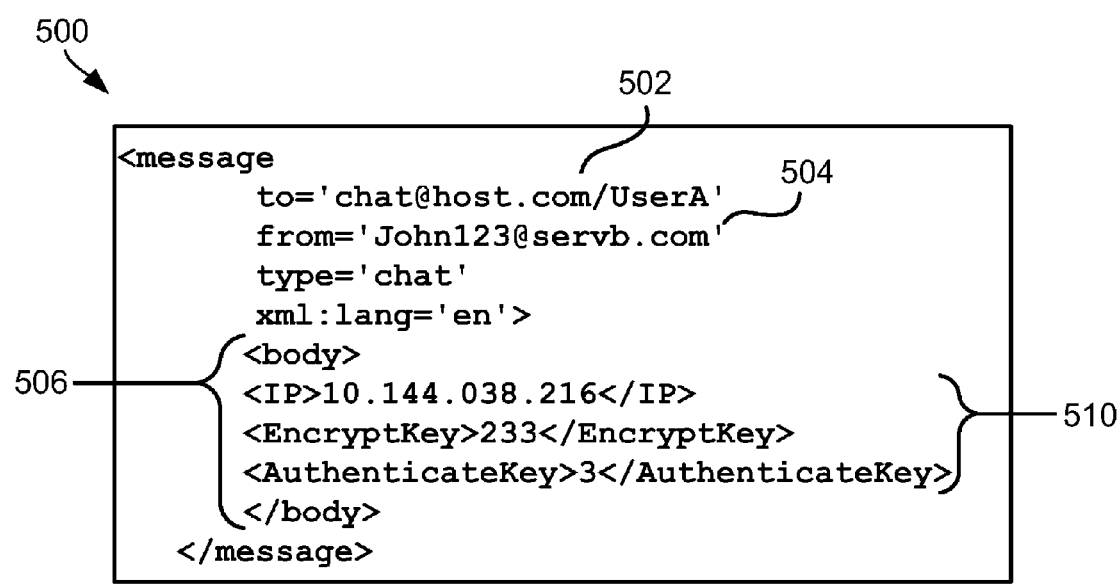
FIG. 5 illustrates an example of an instant message returning connection information to a videoconferencing unit.

As discussed previously, a response instant message is sent from one videoconferencing unit to another to return connection information for establishing a videoconference call. Referring to FIG. 5, an example of a response instant message 500 returning connection information to a videoconferencing unit is illustrated. Again, the response instant message 500 is illustrated in pseudo-code for convenience, but it is understood that the actual response instant message 500 includes source code in the Extensible Messaging and Presence Protocol ("XMPP") or other suitable computer language, for example. In addition, the response instant message 500 is shown returning certain information in an exemplary format in the Extensible Markup Language ("XML"). The details and format are provided for illustrative purposes, and the instant message 500 can have any details and format commensurate with the teachings of the present disclosure.

As with the request instant message (400; FIG. 4) discussed previously, the response instant message 500 lists the instant message identity 502 of the source (e.g., "John123@servb.com") and the instant message identity 504 of the destination (e.g., "chat@host.com/UserA"), which belongs to the videoconferencing unit that originally requested information. The response instant message 500 is configured in English. The response instant message 500 can also include a body 506 that can contains various pieces of information, in some form of code for the receiving videoconference unit, requested from the sending unit.

The body 506 includes text and markup 510 representing various pieces of information requested by the first videoconferencing unit. For example, the text and markup 510 includes connection information, such as the ISDN address, IP address, SIP address, or IP-to-IP Gateway number, of the sending videoconferencing unit. In addition, the information in text and markup 510 includes the requested encryption or authentication information that are needed to establish a videoconference call with the the receiving videoconferencing unit. This encryption or authentication information can be formated using various headers, tags, codes, or the like that will be recognized by the software of the various videoconferencing units. Because the instant message 400 is coded in XML or other suitable computer language, the recieving videoconferencing unit has software capable of parsing and extracting information from the instant message 400 and capable of processing the extracted information to validate and comply with the request.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A first videoconferencing unit, comprising:
   one or more network interfaces for sending and receiving instant messages and for establishing videoconference calls over one or more networks;
   an instant messaging application automatically generating one or more outgoing request instant messages requesting videoconferencing connection information and sending with at least one of the network interfaces the outgoing request instant messages to one or more instant messaging identities associated with one or more second videoconferencing units, the instant messaging application obtaining videoconferencing connection information from one or more incoming response instant messages received from the instant messaging identities of the second videoconferencing units; and
   a videoconference application initiating one or more videoconference calls via at least one of the network interfaces using received videoconferencing connection information.

2. The unit of claim 1, further comprising a user interface receiving one or more instant messaging identities of one or more second videoconferencing units and providing received instant messaging identities to the instant messaging application, wherein the instant messaging application uses the received instant messaging identities to automatically generate the one or more outgoing request instant messages.

3. The unit of claim 2, wherein the user interface comprises a buddy list function accessing a database storing one or more instant messaging identities of one or more second videoconferencing units.

4. The unit of claim 1, further comprising a database having videoconferencing connection information of the videoconferencing unit, wherein—
   at least one of the network interfaces receives an incoming request instant message from a requesting videoconferencing unit, the incoming request instant message requesting videoconferencing connection information from the first videoconferencing unit, and
   the instant messaging application automatically obtains requested videoconferencing connection information from the database in response to the incoming request instant message and automatically constructs an outgoing response instant message for sending to the other videoconferencing unit, the outgoing response instant message including the instant messaging identity of the first videoconferencing unit as a source, the instant messaging identity of the requesting videoconferencing unit as a destination, and obtained videoconferencing connection information.

5. The unit of claim 4, wherein the instant messaging application includes an authentication algorithm authenticating the incoming request instant message received from the second videoconferencing unit.

6. The unit of claim 1, wherein the videoconferencing connection information comprises an Integrated Services Digital Network address, an Internet Protocol address, a Session Initiation Protocol address, or a number for an IP-to-IP Gateway.

7. The unit of claim 6, wherein the videoconferencing connection information further comprises encryption information associated with the second videoconferencing unit.

8. A videoconferencing method, comprising:
   receiving one or more instant messaging identities associated with one or more videoconferencing units;

automatically generating one or more request instant messages requesting videoconferencing connection information from one or more of the videoconferencing units;

sending one or more of the request instant messages to one or more of the instant message identities associated with one or more of the videoconferencing units;

receiving one or more response instant messages from one or more of the videoconferencing units, automatically obtaining requested videoconferencing connection information from one or more of the response instant messages; and initiating one or more videoconference calls with one or more of the videoconference units using obtained videoconferencing connection information.

9. The method of claim 8, wherein receiving one or more instant messaging identities associated with one or more videoconferencing units comprises receiving the one or more instant message identities as user input, or accessing a database storing the one or more instant messaging identities.

10. The method of claim 8, wherein automatically configuring one or more request instant messages requesting videoconferencing connection information comprises automatically coding the one or more request instant messages by including one or more indications of requested videoconferencing connection information.

11. The method of claim 8, wherein automatically obtaining requested videoconferencing connection information from the one or more response instant messages comprises:
parsing the one or more response instant messages;
reading instant message identities from the parsed instant messages; and
reading videoconferencing connection information associated with the instant message identities from the parsed instant messages.

12. A first videoconferencing unit, comprising:
a database storing videoconferencing connection information of the first videoconferencing unit;
one or more network interfaces for sending and receiving instant messages and for establishing videoconference calls over one or more networks;
an instant message application communicatively coupled to the database and the network interfaces, the instant message application configured to:
receive at least one incoming request instant message from at least one second videoconference unit requesting the connection information of the first videoconferencing unit,
obtain the connection information from the database,
obtain an instant message identity of the at least one second videoconference unit from the incoming request instant message,
automatically generate at least one outgoing response instant message including obtained connection information, and
send the at least one outgoing response instant message to the instant message identity of the at least one second videoconferencing unit; and
a videoconference application communicatively coupled to the one or more network interfaces and establishing a videoconferencing connection upon detection of an incoming videoconferencing call from the at least one second videoconference unit.

13. The unit of claim 12, wherein to automatically generate at least one outgoing request instant message, the instant message application constructs the at least one outgoing request instant message to include the instant message identity of the first videoconferencing unit as a source, the instant message identity of the at least one second videoconferencing unit as a destination, and one or more indications of requested connection information.

14. The unit of claim 12, wherein the instant message application is further configured to authenticate the at least one incoming request instant message received from the at least one second videoconferencing unit using an authentication algorithm.

15. The unit of claim 12, wherein the connection information comprises an Integrated Services Digital Network address, an Internet Protocol address, a Session Initiation Protocol address, or a number for an IP-to-IP Gateway.

16. The unit of claim 15, wherein the connection information further comprises encryption information associated with a sending videoconference unit.

17. The unit of claim 12, wherein the instant message application is further configured to:
automatically generate at least one outgoing request instant message requesting connection information from at least one other videoconferencing unit,
send the at least one outgoing request instant message to the at least one other videoconferencing unit with at least one of the network interfaces,
obtain connection information from at least one incoming response instant message received from the at least one other videoconferencing unit, and
provide the obtained connection information to the videoconference application,
wherein the videoconference application initiates a videoconference call with the at least one other videoconferencing unit using the obtained connection information.

18. The unit of claim 17, further comprising a user interface receiving at least one instant message identity of the at least one other videoconferencing unit and providing the at least one instant message identity to the instant message application, wherein the instant message application uses the received instant message identity to automatically generate the at least one outgoing request instant message.

19. The unit of claim 18, wherein the user interface comprises an address book function accessing a database storing one or more instant message identity of one or more other videoconferencing units.

20. A videoconferencing method, comprising:
receiving, at a first videoconferencing unit, one or more incoming request instant messages from one or more instant message identities, the incoming request instant messages requesting connection information for establishing a videoconference with the first videoconferencing unit;
obtaining requested connection information;
automatically generating one or more outgoing response instant messages including obtained connection information in parseable form;
sending the outgoing response instant messages to the instant message identities;
detecting one or more incoming videoconference calls from one or more second videoconferencing units; and
connecting with the one or more incoming videoconference calls when detected.

21. The method of claim 20, wherein the connection information comprises an Integrated Services Digital Network address, an Internet Protocol address, a Session Initiation Protocol address, or a number for an IP-to-IP Gateway for the first videoconferencing unit.

22. The method of claim 21, wherein the connection information further comprises encryption information associated with first videoconferencing unit.

* * * * *